United States Patent [19]

Flanagan

[11] 4,190,712
[45] Feb. 26, 1980

[54] LOW DENSITY ENERGY MANAGEMENT URETHANE FOAM

[75] Inventor: Kirby E. L. Flanagan, Rochester, N.H.

[73] Assignee: McCord Corporation, Detroit, Mich.

[21] Appl. No.: 936,815

[22] Filed: Aug. 25, 1978

Related U.S. Application Data

[63] Continuation-in-part of Ser. No. 746,826, Dec. 2, 1976, Pat. No. 4,116,893, which is a continuation-in-part of Ser. No. 481,498, Jun. 21, 1974, abandoned.

[51] Int. Cl.$^2$ .................... C08G 18/63; C08G 18/65
[52] U.S. Cl. .................... 521/137; 264/45.5; 264/45.6; 264/46.8; 264/DIG. 14; 293/109; 521/159; 521/167; 521/176; 521/129
[58] Field of Search ............ 521/137, 159, 167, 176, 521/129

[56] References Cited

U.S. PATENT DOCUMENTS

| | | | |
|---|---|---|---|
| 3,248,373 | 4/1966 | Barringer | 260/2.5 AM |
| 3,591,561 | 7/1971 | Kazama et al. | 260/2.5 AM |
| 3,595,814 | 7/1971 | Lloyd et al. | 260/2.5 AM |
| 3,630,973 | 12/1971 | Ardis | 260/2.5 AM |
| 3,661,811 | 5/1972 | Hardy et al. | 260/2.5 AM |
| 3,664,976 | 5/1972 | Evans et al. | 260/2.5 AM |
| 4,119,586 | 10/1978 | Shah | 521/137 |

*Primary Examiner*—H. S. Cockeram
*Attorney, Agent, or Firm*—McGlynn and Milton

[57] ABSTRACT

An impact energy-absorbing, low density urethane foam for use in automobile bumpers has good moldability and is relatively temperature insensitive, i.e. gives approximately the same physical performance over a wide range of temperatures. This foam is characterized by its good multiple impact performance and low compression set values. The foam is water blown in a closed mold from a quasi-prepolymer system. The molded density is preferably in the range of 5 to 10 PCF.

The foam formulation is based on a polymer polyol of a poly (oxypropylene/ethylene) triol reacted with a styrene/acrylonitrile monomer mixture which triol thus modified is reacted with (1) a roughly 1/5 to 1.5/1 weight amount of a hydroxy terminated polybutadiene homopolymer based on polymer polyol, (2) a 50 to 150 equivalent weight polyol crosslinker of 2 to 6 functionality, (3) a MDI glycol or triol quasi-prepolymer, and (4) some water.

2 Claims, No Drawings

LOW DENSITY ENERGY MANAGEMENT URETHANE FOAM

RELATED APPLICATION

This application is a continuation-in-part of an earlier filed application "Impact Energy Absorbing Urethane Foam", Ser. No. 746,826, by the present inventor and filed Dec. 2, 1976, now U.S. Pat. No. 4,116,893, issued Sept. 26, 1978, which was a continuation-in-part of Ser. No. 481,498, filed June 21, 1974, and now abandoned.

INTRODUCTION

Urethane foams have been used for some years in automobile trim components, usually contained within a tough vinyl or ABS skin or shell, for styling purposes and as impact energy-absorbing safety padding. Recent efforts have been directed to the manufacture of urethane foam impact energy-absorbing automobile bumpers. Desirably for bumper applications the foam should have the lowest possible density while still having good energy-absorbing performance and for appearance reasons good recovery from multiple impacts.

It has been known to water-blow flexible or semirigid urethane foams to very low densities, e.g. 4 to 15 PCF (lbs./ft.$^3$) and to use such low density urethane foams in automotive applications. However, until now, urethane foams of low densities have not performed well as impact energy-absorbing safety padding because, inter alia, they were too soft and, perhaps most important in automotive applications, did not give relatively constant performance over the wide range of temperatures encountered in service, i.e. the performance of the foams were quite temperature sensitive.

THIS INVENTION

This invention is concerned with a quite effective impact energy-absorbing urethane foam of low density, less than 15 PCF characterized by its temperature insensitivity and reduced compression set and which is particularly suited for automotive applications.

This foam has a reasonably good specific energy absorption, at least 15 in.-lbs./in.$^3$ at 70° F. and 7 PCF and an efficiency therefore greater than 50% at any temperature in the range of $-20°$ F. to 125° F. The outstanding properties of the foam are its load/temperature index value or its temperature insensitivity and its ability to recover from impact indentations. The 50% compression/deflection (C/D hereafter) value of the foam at $-20°$ F. compared to this value at 125° F. differs by a factor of less than 5. It suffers a less than 3% impact set after 30 minutes at any temperature in the range of $-20°$ F. through 125° F. when impacted to a strain of 75%.

The low density foam of this invention is made from an aromatic diisocyanate prepolymer system, water-blown (as opposed to hydrofluorocarbon blown), inside of a closed mold. The amount of water used for blowing is relatively large, greater than 1.0 weight percent in all cases, which increases hardness. This amount of water produces, of course, a large amount of short-chain urea linkages which probably, in part, contribute to the improved performance of the foam. An amine or glycol crosslinker is used to improve moldability and to further increase hardness. Hydrofluorocarbon can be used if desired in addition to water to help control the final density.

The base polymer polyol used in the foam formulation is specifically a reaction product or copolymer of 2 to 6 parts by weight of a poly ($C_2$–$C_4$ oxyalkylene) triol and one part by weight of an olefinic $C_3$–$C_7$ nitrile/vinyl aromatic monomer mixture. The polymer has a molecular weight in the range of 4000 to 8000. See Belgian Patent to Union Carbide Corporation, 270 Park Avenue, New York, N.Y. No. 788,115 (1973), especially Table VIII on page 38, polyols "D" and "IX" and also U.S. Pat. Nos. 3,304,273; 3,383,351; and 3,418,354.

A polybutadiene polymer is used in conjunction with the polymer polyol. It is a hydroxy terminated homopolymer that has a molecular weight in the range of 2000 to 4000, a functionality in the range of 2 to 3, preferably 2.2 to 2.4, and an equivalent weight in the range of 750 to 1750.

The use of water alone as a crosslinker in the foam formulation may result in a foam that is too "fast" to be formed in a closed mold. Therefore, a low molecular weight polyol, preferably a glycol or triol, crosslinker is used in addition to the water. The crosslinker has a relatively low molecular weight, in the range of 100 to 1000, a functionality in the range of 2 to 6 and an equivalent weight in the range of 50 to 150. Besides the sorbitol polyether used in the example, other polyethers can be used such as tetrols derived from pentaerythritol.

The foam is prepared by the prepolymer method. The aromatic diisocyanate is preferably one having only one isocyanato group per aromatic nucleus such as methylene bis (4-phenyl isocyanate) (MDI) as this gives a more linear structure than, say, toluene diisocyanate. The isocyanate is reacted with a polyol having a functionality in the range of 2 to 6 and an equivalent weight in the range of 30 to 150 selected from the group consisting of 100 to 1000 molecular weight triols and 100 to 200 molecular weight ether glycols, e.g. diethylene or dipropylene glycol. The prepolymer has a FNCO (free isocyanate) content of 20 to 35% and is used in an amount to give an isocyanate index in the range of 90 to 115%.

The following is the preferred ranges of the ingredients.

|  | Parts by Weight |
| --- | --- |
| Polymer polyol | 70 to 90 |
| Polybutadiene polymer | 10 to 120 |
| Crosslinker | 10 to 40 |
| Water | 1 to 5 |
| Prepolymer | To yield 90–115% Index |
| Catalyst | 0 to 2 |

A conventional organo-heavy metal or tertiary amine catalyst, such as dibutyl tin dilaurate, stannous octoate or Dabco (triethylene diamine), is used as required.

The final foam is quite stiff (i.e. has a high modulus) and has a density in the range of 4 to 15, preferably 5 to 10, pounds per cubic foot. The foamed article is made in a closed mold using a shot weight to give a pack factor in the range of 1.5 to 8. The free blown densities of these foams are about 2.5 to 10 pounds per cubic foot.

Besides the above specific energy absorption and low temperature performance of the foam, the foam has reasonably good elongation, generally greater than 50% and reasonably good tensile strength, greater than 75 psi. It takes less than a 3% impact set when impacted to a strain of 75% at 70° F. after allowing 30 minutes for recovery at that temperature.

As here used "specific energy" is a measure of the foam's ability to absorb energy and is defined as the area under the load curve of a sample tested in compression as on an Instron Tester. The values are given in inch-pounds/cubic inch at 50% deflection, in.-lb.in.$^3$ (50% C/D or e=0.5), and are determined as follows: A 4"×4"×2" thick block is compressed at 2"/min. to 50% C/D and the stress/strain plot recorded on graph paper. The area between the loading curve and the horizontal axis is the specific energy. Ideally, this curve would be square-form. The "efficiency" of the foam is ratio of the specific energy of the foam over the area of ideal square-form wave.

The temperature index is obtained in accordance with ASTM-2406 except that the test is run at the indicated temperatures, not just at 70° F. as is usual, and the compression/deflection at the lower temperature is divided by that at the higher temperature to obtain the factor by which they differ.

EXAMPLE

|  | Parts by Weight |
|---|---|
| Polymer polyol | 75.0[1] |
| Polybutadiene polymer | 30.0[2] |
| Crosslinker | 15.0[3] |
| Water | 1.0 |
| Triethylene diamine | 1.0 |
| MDI Prepolymer | 50.9[4] |
| Silicone (for cell control) | 1.0[5] |

Notes:
[1] a 6000 molecular weight copolymer of (a) four parts by weight of a 4500 molecular weight poly [oxypropylene (85%)—ethylene (15%)] triol reacted with (b) one part by weight of a 50/50 weight ratio acrylonitrile/styrene monomer mixture. Union Carbide Chemicals Co. NIAX 34-28 (See Polyol D of Table VIII of the Belgian patent, supra).
[2] a 3000 molecular weight hydroxy terminated polybutadiene homopolymer having a functionality of 2.4 and an equivalent weight of 1250, Arco Chemical R-45HT.
[3] BASF Wyandotte Corporation (Wyandotte, Michigan 48192) PA 14635 sorbitol polyether. It has 6 reactive hydrogens per molecule and an equivalent weight of 115.
[4] E-451 (Mobay Chemical Company, Division of Baychem Corp., Pittsburgh, Pennsylvania 15205). This is a 50/50 blend of Mobay's Mondur PF and Mondur CD. It has a FNCO of about 27-28 and is a linear polymer with a high degree of aromaticity. Mondur PF is a tripropylene glycol adductof MDI. Mondur CD is a "liquid" or modified MDI thatcontains a small amount of some trimers and carbodiimideswhich disrupt the symmetry and inhibit the crystallizationof the final preprolymer molecule and help keep the mixtureliquid, which is a convenience. Isonate 143L (Upjohn Company,Industrial Chemicals Division, North Haven, Connecticut 06473)is the rough equivalent of Mondur CD.
[5] Union Carbide L-5303.

The foam is made by simply blending the ingredients as in a mixing head at room temperature. The foam has a cream time of 24 seconds, a rise time of 76 seconds, and is tack free in 145 seconds. Its free blown density is 4.55 lbs./ft.$^3$. A fluorohydrocarbon blowing agent can be used to reduce and control the molded density.

This foam can be used to make front and rear bumbers as for the 1980 Chrysler F Body automobile.

Six-inch cubes of the foam were prepared for testing by simple blender mixing of the ingredients in a cup, pouring the blend in a mold, closing the mold and allowing the foaming reaction to go to completion for about six minutes. The cubes were impacted at three different temperatures at 5 miles per hour with a flat faced sled to a strain of approximately 75%. The impact force and deflection were recorded and the values in the following table were calculated:

| Temp. | PCF | Impact Test Results | | | | |
|---|---|---|---|---|---|---|
|  |  | Max. Strain | M | SE | S | MN |
| 70° F. | 5 | .91 | 35 | 10 | 1.8 | .81 |
| " | 6 | .87 | 45 | 14 | 1.9 | .83 |
| " | 7 | .81 | 64 | 20 | 1.5 | .82 |
| " | 8 | .79 | 75 | 22 | 1.4 | .75 |
| " | 9 | .68 | 107 | 35 | 1.7 | .77 |
| " | 10 | .60 | 108 | 43 | 1.4 | .76 |
| 125° F. | 5 | .90 | 17 | 5 | 1.1 | .85 |
| " | 6 | .87 | 23 | 8 | 1.2 | .87 |
| " | 7 | .80 | 34 | 10 | 1.1 | .81 |
| " | 8 | .78 | 39 | 12 | 1.0 | .80 |
| " | 9 | .67 | 62 | 19 | 1.0 | .79 |
| " | 10 | .58 | 86 | 26 | .8 | .79 |
| −20° F. | 5 | .84 | 59 | 21 | .9 | .85 |
| " | 6 | .74 | 94 | 34 | .7 | .82 |
| " | 7 | .64 | 132 | 46 | 1.1 | .83 |
| " | 8 | .57 | 157 | 57 | 1.3 | .81 |
| " | 9 | .56 | 216 | 78 | 2.5 | .82 |
| " | 10 | .53 | 299 | 104 | 2.0 | .77 |

PCF = Density of 6-inch cube in pounds per cubic foot
M = Modulus @ e = 0.5
SE = Specific Energy @ e = 0.5
S = Impact Set, % after 30 min.
N = Maximum (or Peak) Mechanical Efficiency
"e" is the proportion compressed. At e = 0.5 the foam iscompressed to ½ of its original thickness.
"Modulus" is the stress required at e = 0.5.
"Mechanical Efficiency" is, on a plot of compression forcev. deflection, the average force required to achieve acertain deflection divided by the maximum force toachieve that deflection, or it can be considered to bethe actual energy divided by the ideal energy inputfor that plot.

PCF=Density of 6-inch cube in pounds per cubic foot
M=Modulus @ e=0.5
SE=Specific Energy @ e=0.5
S=Impact Set, % after 30 min.
N=Maximum (or Peak) Mechanical Efficiency
"e" is the proportion compressed. At e=0.5 the foam is compressed to ½ of its original thickness.
"Modulus" is the stress required at e=0.5.
"Mechanical Efficiency" is, on a plot of compression force v. deflection, the average force required to achieve a certain deflection divided by the maximum force to achieve that deflection, or it can be considered to be the actual energy divided by the ideal energy input for that plot.

I claim:

1. An impact energy-absorbing urethane foam made from the following formulation:

|  | Parts by Weight |
|---|---|
| Polymer polyol | 70 to 90 |
| Polybutadiene polymer | 10 to 120 |
| Crosslinker | 10 to 40 |
| Water | 1 to 5 |
| Prepolymer | To yield 90–115% Index |
| Catalyst | 0 to 2 | wherein:
said polymer polyol has a molecular weight in the range of 4000 to 8000 and comprises in the range of 2 to 6 parts of a poly ($C_2$–$C_4$ oxyalkylene) triol reacted with one part of a vinyl aromatic/olefinic $C_3$–$C_7$ nitrile monomer mixture;
said polybutadiene polymer is a hydroxy terminated polybutadiene homopolymer having a molecular weight in the range of 2000 to 4000, a functionality in the range of 2 to 3, and an equivalent weight in the range of 750 to 1750;
said crosslinker is a polyol having a functionality in the range of 2 to 6 and an equivalent weight in the range of 50 to 150;

said prepolymer is a reaction product of (a) an aromatic diisocyanate having one isocyanato group per aromatic nucleus and (b) a polyol having a molecular weight in the range of 100 to 1000, a functionality in the range of 2 to 6, an equivalent weight in the range of 30 to 150, and said prepolymer has a free isocyanate content in the range of 20 to 35 percent; and said urethane foam being prepared in a closed mold and having a density in the range of 4 to 15 lbs./ft.$^3$, a specific energy at 50% C/D greater than 15 in.-lbs./in.$^3$ at 70° F. and 7 PCF, a temperature index $-20°/125°$ F. of less than 5 and suffering less than a 3% impact set when impacted to a strain of 75% at 70° F. after allowing recovery for 30 minutes at 70° F.

2. The urethane foam of claim 1 wherein:

said polymer polyol is a 6000 molecular weight copolymer of a poly (oxypropylene-ethylene) triol reacted with a 50/50 by weight styrene/acrylonitrile monomer mixture;

said polybutadiene polymer has a molecular weight of about 3000, a functionality of about 2.3, and an equivalent weight of 1250;

said crosslinker is a sorbitol polyether having a reactive hydrogens and an equivalent weight of 115;

said prepolymer is the reaction product of MDI and tripropylene glycol; and said catalyst is triethylene diamine.

* * * * *